(12) United States Patent
Payton

(10) Patent No.: US 6,625,084 B1
(45) Date of Patent: Sep. 23, 2003

(54) SYSTEM FOR ACOUSTICALLY PASSING ELECTRICAL SIGNALS THROUGH A HULL

(75) Inventor: Robert M. Payton, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/224,227

(22) Filed: Aug. 20, 2002

(51) Int. Cl.[7] .............................................. H04B 11/00
(52) U.S. Cl. ..................................................... 367/134
(58) Field of Search ................................ 367/134, 903, 367/135, 137; 310/334

(56) References Cited

U.S. PATENT DOCUMENTS 4,928,264 A * 5/1990 Kahn ........................ 367/141
5,452,265 A * 9/1995 Corsaro ...................... 367/152
5,594,705 A * 1/1997 Connor et al. ................ 367/13

OTHER PUBLICATIONS

Hobart et al., "Acoustic Modem Unit", Oceans 2000 MTS/IEEE Conference and Exhibition, pp. 769–772, vol. 2., Sep. 2000.*

* cited by examiner

Primary Examiner—Ian J. Lobo

(57) ABSTRACT

A system is disclosed that allows passage of electrical signals across a rigid boundary, such as a pressure hull of a submarine or vessel that operates in water. The passages provided by acoustic means are accomplished without any holes being made in the rigid boundary.

6 Claims, 1 Drawing Sheet

SYSTEM FOR ACOUSTICALLY PASSING ELECTRICAL SIGNALS THROUGH A HULL

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates generally to electrical hull penetrators and, more specifically, to electrical hull penetrators that allow passage of analog or digital signals across a rigid boundary (i.e., a submarine hull) without a physical hole being made in the boundary.

(2) Description of the Prior Art

Vessels operated in water typically require the use of devices, such as sensors or processors, that are located on the external side of the associated hull and immersed in water. The information gathered by these devices needs to be transferred to equipment located internal to the vessel and to do so commonly requires a hull penetrator, that is, a device that causes openings to be forced through the hull, such as a Submarine Electrical Hull Penetrator used for a pressure hull of a submarine.

Submarine Electrical Hull Penetrators (EHPs) are costly. Every hole cut into the pressure hull requires sub-safe approval at multiple levels of responsibility and custody. Further, EHPs require a large amount of supporting documentation and testing over the life-cycle of an installation, such as a submarine. EHPs add weight to the submarine and weaken the hull. The highcost and typical snail-slow approval process for adding a new EHP prevents short-term, special purpose, installations for experimental gear, or special deployments. If one could take the penetration (i.e., the hole) out of the EHP, tremendous cost advantage would be reaped.

A Penetration-less Electrical Hull Penetrator (PEHP) would remove the current focus on submarine survival and allow a restoration of focus on the functionality and survival of the wet end equipment, that is, equipment designed to withstand continuous immersion in water. A PEHP would significantly lower the cost and would greatly accelerate the approval and installation of wet end equipment. Further, a PEHP would greatly decouple wet end equipment requirements from the major sub-safe considerations (i.e., hull breach).

Systems that provide the transmission of information through solid boundaries are known and some of which are disclosed in U.S. Pat. Nos. 4,932,006, 5,437,058 and 5,982,297. U.S. Pat. No. 4,932,006 discloses a method for transmitting a signal through a wall/hull by passing a current therethrough and measuring magnetic field variations generated thereby. U.S. Pat. No. 5,437,058 discloses a wireless shipboard data coupler, wherein a 1 MHz current is injected into the hull and flows along its surface and wraps around walls where it is detected. The data is modulated prior to being "injected" into the hull. U.S. Pat. No. 5,982,297 discloses an ultrasonic data communication system for transforming data through a medium which can be metal. Data is modulated, amplified and transmitted through medium as an ultrasonic signal where it is detected/demodulated. It is desired to provide a system particularly suited for a submarine and for the transmission of electrical signals through a solid boundary, such as a hull, without the need of using an applied current or without being limited to the use of ultrasonic signals; that is, without suffering the corresponding transmission loss by using an ultrasonic frequency in the region of 20 to 108 KHz.

The submarine hull is fabricated with thick steel and there are two ways for a signal to penetrate this steel; i.e., magnetically or acoustically. The magnetic option is limited by at least three factors: low induction efficiency, electromagnetic signature (when surfaced) and degaussing considerations. All of these factors compete against using magnetic coupling. It is desired to implement acoustic means for a PEHP. More particularly, it is desired that acoustic means be provided for passing electrical signals through a hull without the need of holes being placed in the hull itself.

SUMMARY OF THE INVENTION

Therefore, it is an object of the present invention to provide a system for acoustically passing electrical signals through a solid rigid boundary, such as a hull of a vessel operated in water, and without creating holes in the boundary.

It is another object of the present invention to provide a hole free data transmission path between the external (immersed in water) and internal (free of water) surfaces of a hull.

It is still another object of the present invention to provide a system comprised of conventionally wet-end equipment for acoustically passing electrical signals through a hull.

Accordingly, the current invention provides a system for acoustically passing electrical signals through a solid rigid boundary comprised of metal and having first and second opposite surfaces being free of openings. The system comprises one or more first buffers for receiving electrical signals being transmitted from a first source and one or more first modulators operatively and respectively connected to the one or more first buffers for modulating and combining the received signals with a carrier signal and providing a representative modulated output therefrom. The system further comprises one or more first transmitting transducers arranged in contact with the first surface of the solid rigid boundary and operatively and respectively connected to the modulated outputs of the one or more first modulators and developing a first acoustic output signal representative thereof. The system further comprises one or more first receiving transducers arranged in contact with the second surface of the solid rigid boundary and in alignment with the first transmitting transducers on the first surface and operatively connected to receive the acoustic output signal of respective transmitting transducers and developing representative outputs thereof. The system further comprises one or more demodulators operatively and respectively connected to receive the representative output of respective one or more first receiving transducers and separating the carrier signal therefrom leaving a first unmodulated electrical signal. The system still further comprises one or more second buffers operatively and respectively connected to receive respective first unmodulated electrical signals of the one or more demodulators and developing representative signals for being transmitted to a second source.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which a single FIGURE illustrates a block diagram of the system of the present invention.

DESCRIPTION OF THE PREFERRED EMBODIMENTS

Figure 1:
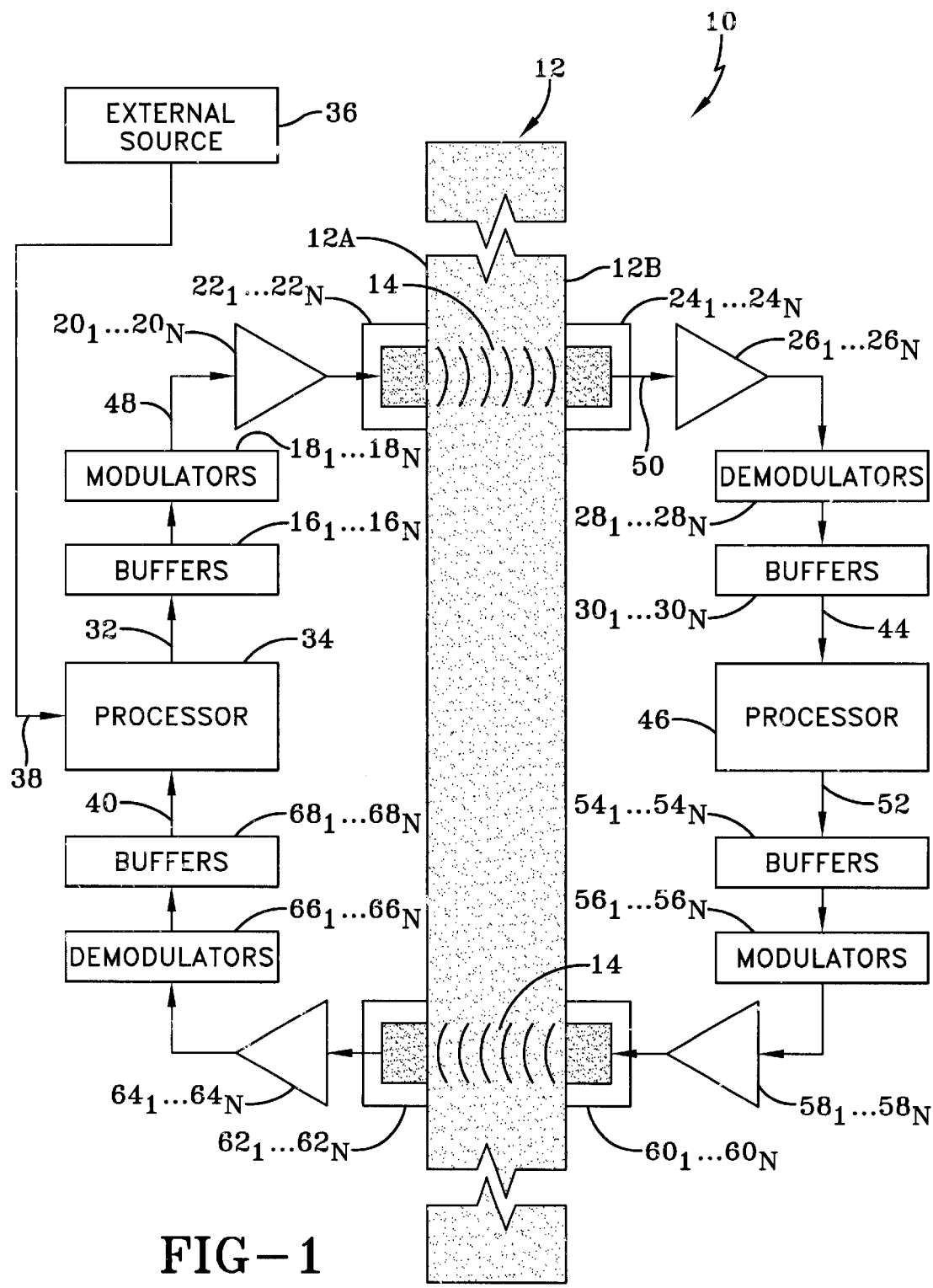

Referring to the drawings, FIG. 1 illustrates a block diagram of a system 10 that is particularly suited for acoustically passing electrical signals through a pressurized metal hull of a submarine serving as a rigid solid boundary 12 and having first and second surfaces 12A and 12B with each of the surfaces being free of any openings. The first surface 12A is capable of withstanding continuous immersion in water, whereas the second surface 12B is free of water. The system 10 uses one or more acoustic signals 14, which can easily penetrate, with low loss, a hull 12 comprised of a steel barrier. The system 10 provides unidirectional and/or bidirectional passage of the acoustic signal 14 through the rigid solid boundary 12, which is in one embodiment is a pressurized hull of a warship operational in water, such as a submarine.

In one embodiment, the system 10 comprises a plurality of buffers $16_1 \ldots 16_n$, preferably data buffers $16_1 \ldots 16_n$, one or more first modulators $18_1 \ldots 18_n$, one or more power amplifiers $20_1 \ldots 20_n$, one or more first receiving transducers $22_1 \ldots 22_n$, one or more first receiving transducers $24_1 \ldots 24_n$, one or more power amplifiers $26_1 \ldots 26_n$, one or more first demodulators $28_1 \ldots 28_n$, and one or more buffers $30_1 \ldots 30_n$, preferably data buffers $30_1 \ldots 30_n$. Although multiple elements, such as $16_1 \ldots 16_n$, are shown for the embodiment of FIG. 1, the practice of this invention, in another embodiment, need only comprise one of each element, such as one buffer $16_1$ operatively connected and cooperating with a single element, such as modulator $18_1$ as shown in FIG. 1.

The elements $16_1 \ldots 16_n$, $18_1 \ldots 18_n$, $20_1 \ldots 20_n$, and $22_1 \ldots 22_n$, as well as elements $62_1 \ldots 62_n$, $64_1 \ldots 64_n$, $66_1 \ldots 66_n$, and $68_1 \ldots 68_n$, to be further described, are conventional elements, known in the art, having the capability of being continuously immersed in water and are sometimes referred to as wet-equipment. All of these elements are easily installed, in a manner known in the art, onto a warship, such as a submarine, and with the elements $22_1 \ldots 22_n$, $24_1 \ldots 24_n$, $60_1 \ldots 60_n$, and $62_1 \ldots 62_n$ simply bonded as packages to and in contact with the appropriate surface 12A or 12B of the hull 12. The elements $24_1 \ldots 24_n$, are positioned in alignment with the respectively oppositely located elements $22_1 \ldots 22_n$ and, similarly, the elements $60_1 \ldots 60_n$, are positioned in alignment with the respectively oppositely located elements $62_1 \ldots 62_n$. It is important to the practice of this invention that the alignment of these elements $24_1 \ldots 24_n$, $22_1 \ldots 22_n$, $60_1 \ldots 60_n$, and $62_1 \ldots 62_n$ is such that the respective acoustic signals 14 transmitted by a respective transmitter transducer, such as $22_1$, and conducted by the metal hull 12 is received by the respective receiver transducer, such as 241.

For the embodiment shown in FIG. 1, each of the one or more buffers $16_1 \ldots 16_n$, respectively receive, on a representative signal path 32, electrical signals selected from the group comprising analog and digital signals that are transmitted by a first source 34.

The first source 34 may be a processor that receives an electrical signal from an external source 36 by way of signal path 38, or for another embodiment to be further described, the signal is supplied by way of signal path 40.

The one or more first modulators $18_1 \ldots 18_n$, are operatively and respectively connected to the one or more first data buffers $16_1 \ldots 16_n$, and operate, in a manner known in the art, so as to modulate and combine the first received signal on signal path 32 with a first carrier and providing a representative modulated output therefrom. The first carrier is preferably selected in the ultra-frequency (mega-hertz range) which are readily and easily produced and handled by transducers $22_1 \ldots 22_n$, and $24_1 \ldots 24_n$, as well as transducers $60_1 \ldots 60_n$, and $62_1 \ldots 62_n$, to be further described. The modulated output of the modulators $18_1 \ldots 18_n$, are preferably and respectively passed to power amplifiers $20_1 \ldots 20_n$, which, in turn, pass the representative modulated output signals on to the one or more first transmitting transducers $22_1 \ldots 22_n$. If desired, although not preferred, the modulated outputs of modulators $18_1 \ldots 18_n$, may be directly passed to the one or more first transmitting transducers $22_1 \ldots 22_n$. The possible bypassing of power amplifiers $20_1 \ldots 20_n$, is equally applicable to the other power amplifiers of FIG. 1.

The one or more first transmitting transducers $22_1 \ldots 22_n$, are operatively and respectively connected to the outputs of the power amplifiers $20_1 \ldots 20_n$, and develop a first acoustic signal 14 representative of its received signal. The acoustic signal 14 is acoustically transmitted through the hull 12 and is received by one or more first receiving transducers $24_1 \ldots 24_n$.

The one or more first receiving transducers $24_1 \ldots 24_n$, are operatively and respectively connected to receive the first acoustic signal output of the respective transmitting transducer $22_1 \ldots 22_n$, and develop a representative output thereof which is preferably transmitted to respective power amplifiers $26_1 \ldots 26_n$. The power amplifiers $26_1 \ldots 26_n$, transmit the received signal onto the first demodulators $28_1 \ldots 28_n$.

The one or more first demodulators $28_1 \ldots 28_n$ are operatively and respectively connected to receive the representative output of the first receiving transducers $24_1 \ldots 24_n$, and separate the first carrier signal, introduced by respective first modulators $18_1 \ldots 18_n$, therefrom leaving a first unmodulated electrical signal that is transmitted to one or more second data buffers $30_1 \ldots 30_n$. The one or more second data buffers $30_1 \ldots 30_n$ are operatively and respectively connected to receive the respective first unmodulated electrical signals and develop representative signals that are transmitted, via signal path 44 to a second source 46, which may be a processor.

In operation, the processor 34, serving as a first signal source, provides one or more analog or digital signals, dependent upon the system configuration selected, that are buffered and electronically modulated onto a continuous wave carried by signal path 48 by way of respective first buffer $16_1 \ldots 16_n$, and first modulators $18_1 \ldots 18_n$. Although signal path 48, as well as other signals illustrated in FIG. 1, is shown as a single serial path, connecting one device $18_1$ to one device $20_1$, it should be recognized that this path may be multiple ($48_1 \ldots 48_n$) parallel paths each connecting respective elements. The single paths, such as $48_1$, is used in FIG. 1 for clarity purposes. The modulated signal on signal path 48 is preferably amplified by a respective power amplifier $20_1 \ldots 20_n$, and transmitted across the hull plate 12 as acoustic signal 14 by the respective transmitted transducer $22_1 \ldots 22_n$. The respective receiver transducers $24_1 \ldots 24_n$, convert the acoustic signal 14 penetrating the hull 12 into an electronic signal and places the converted signal onto signal path 50, which signal is amplified by the respective one or more amplifiers $26_1 \ldots 26_n$, demodulated by the respective one or more first demodulators $28_1 \ldots 28_n$, and buffered by the second data buffers $30_1 \ldots 30_n$, which provide the data output on signal path 44. The data on signal path 44 represents essentially the same data that was on signal path 32, and thus, the data signal originating from the signal source 34 becomes available on the opposite side of the hull plate 12 and made available to the second processor 46.

It should now be appreciated that the practice of the present invention provides an acoustic signal that easily penetrates a steel barrier with low loss and allows passage of analog and digital signals across a rigid boundary, such as a pressure hull, without holes being made in the boundary. More particularly, the system 10 of the present invention allows a signal to be passed acoustically and utilizes a high frequency modulation carrier signal so as to minimize the loss thereof.

In another embodiment that operatively cooperates with the previously discussed embodiment, a bidirectional system 10 is provided, that is, the system 10 can not only transmit information from the surface of the hull of a warship immersed in water, but also provides information originating from within the submarine itself and transmitting that information from internally located equipment of the warship through the hull so as to be received by equipment externally located on the other side of the hull immersed in water.

The system 10 provides bidirectional transmission and further comprises the second processor 46, which provides the signals in a manner as previously described with reference to processor 34. The electrical signals are transmitted by way of respective signal path 52 to third buffers $54_1 \ldots 54_n$, preferably data buffers. The data buffers $54_1 \ldots 54_n$ operate in a manner as previously described with reference to data buffers $16_1 \ldots 16_n$. Similarly, second modulators $56_1 \ldots 56_n$ operate in a manner similar to modulators $18_1 \ldots$, and power amplifiers $58_1 \ldots 58_n$ operate in a manner as previously described with power amplifiers $20_1 \ldots 20_n$. Similarly, the transmitting transducers $60_1 \ldots 60_n$ operate in a manner as described for transmitting transducers $22_1 \ldots 22_n$ and the receiving transducers $62_1 \ldots 62_n$ operate in a manner similar to receiving transmitters $24_1 \ldots 24_n$. Further, second demodulators $66_1 \ldots 66_n$ and fourth buffers $68_1 \ldots 68_n$, respectively operate in a manner similar to first demodulators $28_1 \ldots 28_n$, and second buffers $30_1 \ldots 30_n$.

It should now be appreciated that the practice of the present invention provides for a bidirectional transmission initially from either inside the vessel through the pressure hull to equipment located and immersed in water, as well as initially from the equipment immersed in water through the pressure hull and back to equipment free of the water environment. These bidirectional paths, as well as unidirectional paths previously described, may be single paths serving a series of single elements or may be multiple paths servicing multiple elements It will be understood that various changes and details, steps and arrangement of parts and method steps, which have been described and illustrated in order to explain the nature of the invention, may be made by those skilled in the art within the principle and scope of the invention as expressed in the appending claims.

What is claimed is:

1. A system for acoustically passing electrical signals through a solid rigid boundary comprised of metal and having first and second opposite surfaces each free of openings, said system comprising:

one or more first buffers for receiving electrical signals being transmitted from a first source;

a plurality of modulators operatively and respectively connected to said one or more first buffers for modulating and combining said received signals of said first buffers with a first carrier signal and providing a representative modulated output therefrom;

a corresponding plurality of transmitting transducers arranged in contact with the first surface of said solid rigid boundary and operatively and respectively connected to the modulated outputs of said plurality of modulators and developing a first acoustic output signal representative thereof;

a corresponding plurality of receiving transducers arranged in contact with the second surface of said solid rigid boundary respectively in alignment with the corresponding ones of said plurality of transmitting transducers on said first surface, the respective of said plurality of receiving transducers being operatively and respectively connected to receive the first acoustic signal output of the corresponding ones of said transmitting transducers and developing a representative output thereof;

a corresponding plurality of demodulators operatively and respectively connected to receive the representative output of corresponding ones of said plurality of receiving transducers and separating said first carrier signal therefrom leaving a first unmodulated electrical signal;

one or more second buffers operatively and respectively connected to receive respective first unmodulated electrical signals of said plurality of demodulators and developing representative electrical signals for transmittal to a second source;

one or more third buffers for receiving electrical signals being transmitted from a second source;

one or more second modulators operatively and respectively connected to said one or more third buffers for modulating and combining the received signals of said third buffers with a second carrier signal and providing a representative modulated output therefrom;

one or more second transmitting transducers arranged in contact with the second surface of said solid rigid boundary and operatively and respectively connected to the modulated outputs of said one or more second modulators and developing a second acoustic output signal representative thereof;

one or more second receiving transducers arranged in contact with the first surface of said solid rigid boundary and in alignment with the one or more second transmitting transducers on said second surface and operatively connected to receive the second acoustic output signal of respective second transmitting transducers and developing a representative output thereof;

one or more second demodulators operatively and respectively connected to receive the representative output of said one or more second receiving transducers and separating said second carrier signal therefrom leaving a second unmodulated electrical signal; and one or more fourth buffers operatively and respectively connected to receive respective second unmodulated electrical signals of said one or more second demodulators and developing representative signals for being transmitted to said first source.

2. The system according to claim 1, wherein a power amplifier is interposed (1) between each of said plurality of modulators and said plurality of transmitting transducers, (2) between each of said one or more first receiving transducers and each of said one or more first demodulators, (3) between each of said one or more second modulators and each of said one or more second transmitting transducers, and (4) between each of said one or more second receiving transducers and each of said one or more second demodulators.

3. The system according to claim 2, wherein said first surface of said solid rigid boundary is capable of withstanding continuous immersion in water and said second surface of said solid rigid boundary is free of water.

4. The system according to claim 3, wherein said (1) one or more first buffers, (2) plurality of modulators (3) plurality of transmitting transducers, (4) one or more second receiving transducers, (5) one or more second demodulators, (6) one or more fourth data buffers, (7) power amplifiers interposed between said one or more receiving transducers and said one or more demodulators, and (8) power amplifiers interposed between said one or more modulators and said one or more transmitting transducers are all capable of withstanding continuous immersion in water.

5. The system according to claim 1, wherein each of said first and second one or more modulators provide a carrier signal in the mega hertz range.

6. The system according to claim 1, wherein said electrical signals being transmitted from said first and second sources are selected from the group consisting of analog and digital signals.

* * * * *